United States Patent
Corcoran et al.

(10) Patent No.: US 6,741,949 B2
(45) Date of Patent: May 25, 2004

(54) REAL TIME PAVEMENT PROFILE INDICATOR

(75) Inventors: Paul T. Corcoran, Washington, IL (US); Federico Fernandez, Washington, IL (US)

(73) Assignee: Caterpillar Inc, Peoria, IL (US)

(*) Notice: Subject to any disclaimer, the term of this patent is extended or adjusted under 35 U.S.C. 154(b) by 28 days.

(21) Appl. No.: 10/015,008

(22) Filed: Dec. 11, 2001

(65) Prior Publication Data

US 2003/0110005 A1 Jun. 12, 2003

(51) Int. Cl.[7] .............................. G01B 5/20; G01B 11/00
(52) U.S. Cl. ....................... 702/167; 702/155; 702/158; 340/442
(58) Field of Search ................................ 702/149, 150, 702/151, 154, 167; 404/72, 75, 84.1; 701/50, 207, 213; 340/442, 901, 905

(56) References Cited

U.S. PATENT DOCUMENTS

| | | | | |
|---|---|---|---|---|
| 4,171,907 A | * | 10/1979 | Hill et al. ................... | 356/5.11 |
| 4,697,352 A | * | 10/1987 | Angove ........................ | 33/523 |
| 5,401,115 A | * | 3/1995 | Musil et al. ................. | 404/72 |
| 5,510,889 A | | 4/1996 | Herr | |
| 5,647,439 A | * | 7/1997 | Burdick et al. .............. | 172/4.5 |
| 5,736,939 A | * | 4/1998 | Corcoran ..................... | 340/905 |
| 5,774,374 A | | 6/1998 | Scott et al. | |
| 6,188,942 B1 | | 2/2001 | Corcoran et al. | |
| 6,218,935 B1 | * | 4/2001 | Corcoran et al. ........... | 340/444 |
| 6,236,923 B1 | * | 5/2001 | Corcoran et al. ............. | 701/50 |

OTHER PUBLICATIONS

Combatting Pavement Roughness with Rosan; Title: FOCUS, Date: Oct. 2001, p. 4, vol.—issue number(s): none, 1 page.
Publisher: U.S. Dept. of Transportation, Turner—Fairbank Highway Research Center, Place of Publication unknown. Also available on Internet at: http://www.tfhrc.gov/fucus/oct01/rosan.htm 2 pages Author unknown.

* cited by examiner

*Primary Examiner*—Bryan Bui
(74) *Attorney, Agent, or Firm*—Steve D Lundquist; Robin S Fahlberg

(57) ABSTRACT

A method and apparatus for determining a profile of a pavement. The method and apparatus includes determining a slope of a mobile machine as the mobile machine traverses the pavement, and determining a change in elevation of the pavement as a function of the slope and a distance from a first ground engaging member on the mobile machine to a second ground engaging member on the mobile machine, the change in elevation being indicative of a profile of the pavement.

20 Claims, 7 Drawing Sheets

Fig_4_

REAL TIME PAVEMENT PROFILE INDICATOR

TECHNICAL FIELD

This invention relates generally to a method and apparatus for determining a smoothness of a pavement and, more particularly, to a method and apparatus for determining a change in elevation of a pavement that is indicative of a profile of the pavement.

BACKGROUND

It is common to analyze and determine the quality of a pavement in terms of a profile of the pavement; that is, how much the pavement changes in elevation for a given distance. For example, it may be desired to maintain a pavement profile that does not exceed plus or minus 10 mm for every 2500 mm sampled distance. A profile which exceeds this value would require work to be performed on the pavement to reduce excessive deviations from a smooth pavement profile. The excessive profile may be caused during new construction, or perhaps during a re-paving operation.

Typically, special machines, known as profilographs, are used to determine the profile of the pavement. A typical profilograph has a leading wheel toward the front end of the machine, a trailing wheel toward the back end of the machine which is separated by a relatively long distance from the leading wheel, and a measuring wheel at some point near the middle of the machine. The measuring wheel is configured to measure deviations of the pavement as the machine moves. The linear changes in elevation indicate the profile.

During paving operations, the paving work is completed, then the profilograph traverses the pavement recording the profile, including any deviations which exceed allowable tolerances. The locations which did not meet standards would then require additional work, including the possibility of removing and replacing the new pavement.

The above described process is very costly and inefficient, since it requires a dedicated machine which determines problem areas after the paving work is completed, and the possibility exists that some of the work will need to be repeated. It is desired, therefore, to be able to determine a profile of a pavement during real time, i.e., as the work is being performed. For example it would be desirable to be able to determine a profile and correct any out of tolerance areas during a work function such as compaction of the pavement.

The present invention is directed to overcoming one or more of the problems as set forth above.

SUMMARY OF THE INVENTION

In one aspect of the present invention a method for determining a profile of a pavement is disclosed. The method includes the steps of determining a slope of a mobile machine as the mobile machine traverses the pavement, and determining a change in elevation of the pavement as a function of the slope and a distance from a first ground engaging member on the mobile machine to a second ground engaging member on the mobile machine, the change in elevation being indicative of a profile of the pavement.

In another aspect of the present invention an apparatus for determining a profile of a pavement is disclosed. The apparatus includes a mobile machine having a first ground engaging member and a second ground engaging member, the first ground engaging member being a known distance from the second ground engaging member, a slope determining system located on the mobile machine, and a controller located on the mobile machine for receiving a signal indicative of a change in slope from the slope determining system, and responsively determining a change in elevation of the pavement as a function of the change in slope and the distance between the first and second ground engaging members, the change in elevation being indicative of a profile of the pavement.

In yet another aspect of the present invention a method for determining a deviation from a profile specification of a pavement is disclosed. The method includes the steps of establishing a maximum allowable change in slope of the pavement, the maximum allowable change in slope being a function of a maximum allowable profile deviation of the pavement, the maximum allowable profile deviation being indicative of the profile specification, monitoring a change in slope of a mobile machine as the mobile machine traverses the pavement, and determining a condition of the change in slope being greater than the maximum allowable change in slope.

DETAILED DESCRIPTION

Figure 1:
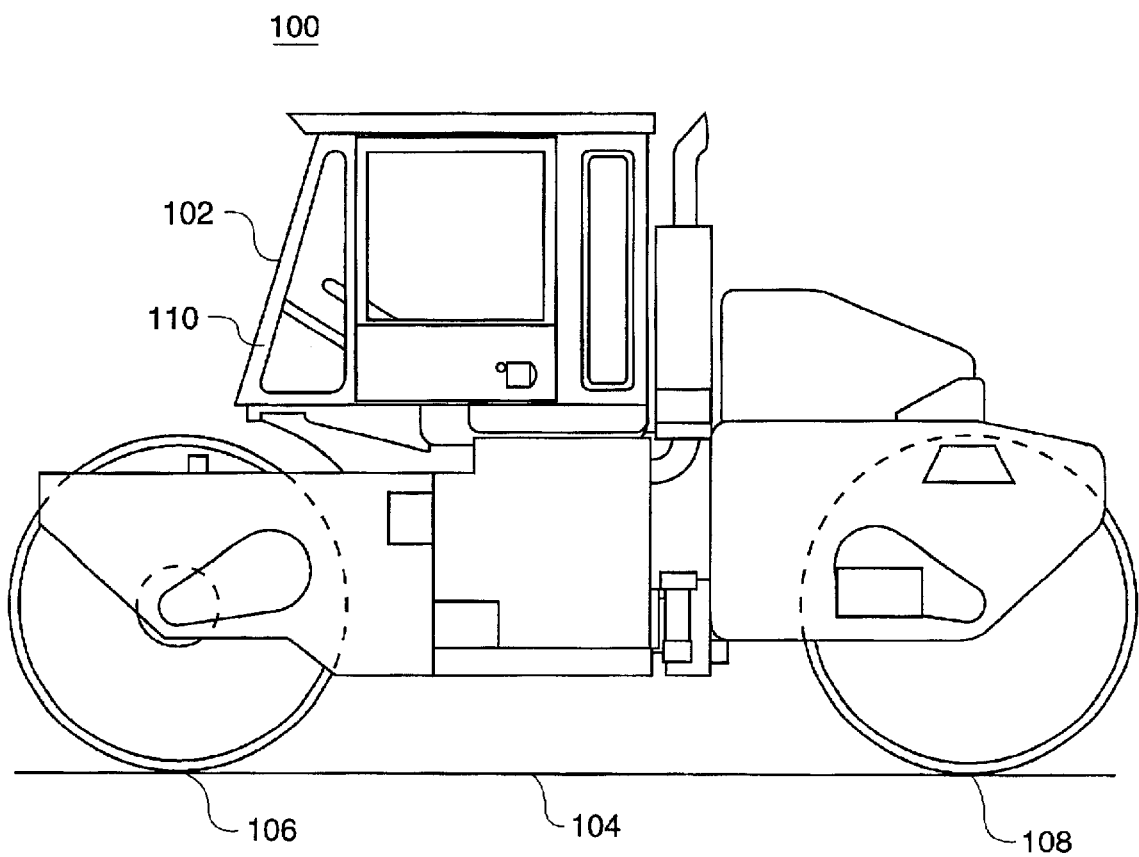
FIG. 1 is a diagrammatic illustration of a mobile machine suitable for use with the present invention.

Referring to the drawings and the appended claims, a method and apparatus 100 for determining a profile of a pavement 104 is shown.

Referring specifically to FIG. 1, a mobile machine 102 is shown traversing a pavement 104. The mobile machine 102 has a first ground engaging member 106 and a second ground engaging member 108. The first and second ground engaging members 106,108 are spaced a known distance from each other. The mobile machine 102 of FIG. 1 is shown specifically as a compactor 110. However, the mobile machine 102 may be some other types of machine, such as a machine dedicated to measuring a profile of the pavement 104, a truck or other vehicle, and the like. In the description below, a machine that may include any of a variety of types of machines, including a compactor, is denoted as a mobile machine 102 and a machine that is specifically designated as a compactor is denoted as a compactor 110.

The profile of the pavement 104 refers to variations in the vertical elevation of the pavement 104 over a given horizontal distance. For example, it may be desired to have a profile that does not exceed a 10 mm variation vertically over a horizontal distance of 5,000 mm. It is noted that the profile refers to the smoothness of the pavement 104 and not to an actual slope. For example, a pavement that follows an incline of 5 degrees would rise 437 mm for every 5,000 mm distance. The profile, however, would be any variations of that desired rise, thus referring to how smoothly the pavement follows the 5 degree rise.

Figure 2:
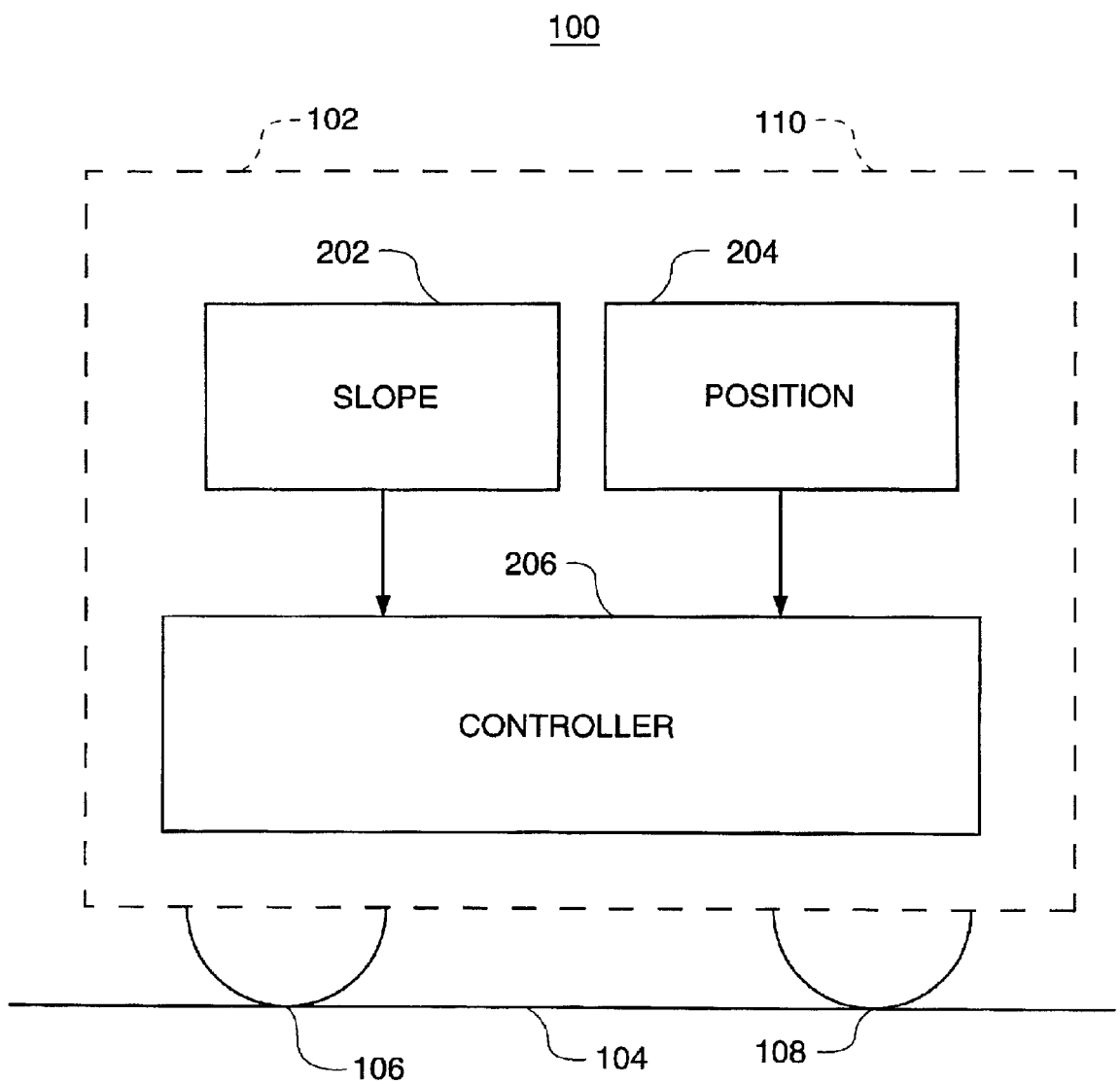
FIG. 2 is a block diagram illustrating a preferred embodiment of the present invention.

Referring to FIG. 2, a block diagram illustrating a preferred embodiment of the present invention is shown.

A slope determining system 202, located on the mobile machine 102, determines the slope of the mobile machine 102 as the pavement 104 is traversed. The slope determining system 202 preferably determines the slope in angular terms, e.g., the number of degrees of angular slope of the mobile machine 102. The slope determining system 202 may include an inclinometer, a laser plane system, or some other suitable device for determining angles with a high degree of precision.

A position determining system 204, located on the mobile machine 102, determines the position of the mobile machine 102 with respect to the pavement 104. The position determining system 204 may be any of a variety of types. For example, a global positioning satellite (GPS) system may be used to determine the position of the mobile machine 102 in geographic coordinates. Alternatively, a dead reckoning system may be used to determine the position of the mobile machine 102 as a function of a distance traveled on the pavement. Other types of position determining systems may be used as well, such as, for example, laser plane systems, and combinations of systems such as GPS and dead reckoning.

A controller 206, located on the mobile machine 102, receives a signal from the slope determining system 202 which is indicative of an angular slope of the pavement 104. In the preferred embodiment, the controller 206 is processor-based, such as by use of a microprocessor. The controller 206 then is adapted to determine a change in elevation of the pavement 104 as a function of the angular slope and the distance between the first and second ground engaging members 106,108. The change in elevation is indicative of a profile deviation of the pavement 104. For example, if the distance between the first and second ground engaging members 106,108 is 3,150 mm and the slope determining system determines an angular slope of 0.23 degrees, the change in elevation is readily determined by multiplying the distance (3,150 mm) by the sine of 0.23 degrees, thus obtaining 12.6 mm as the change in elevation over a distance of 3,150 mm.

The controller 206 is also adapted to receive a signal from the position determining system 204, and responsively determine the location of the angular slope as the mobile machine 102 traverses the pavement 104.

In one embodiment, the mobile machine 102 is the compactor 110, and the controller 206 is further adapted to control an amount of compaction either during the current pass or during a future pass at the determined location.

Figure 3:
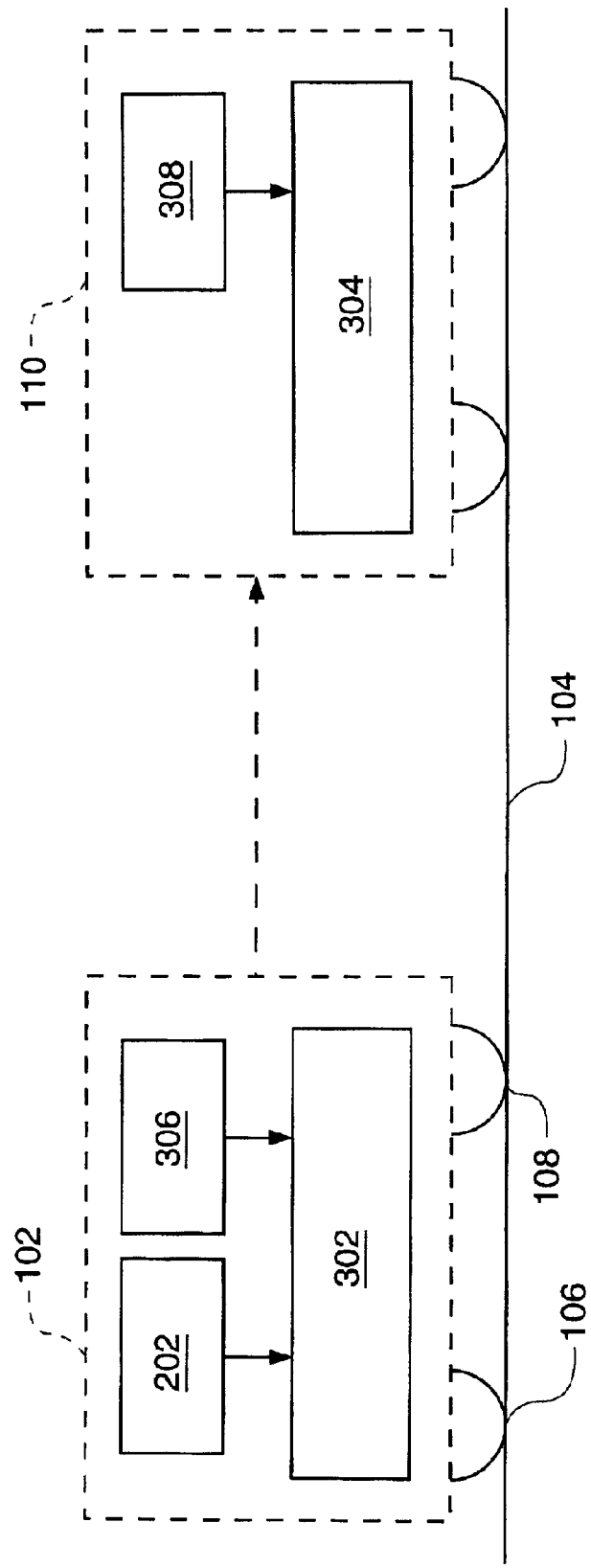
FIG. 3 is a block diagram illustrating another aspect of a preferred embodiment of the present invention.

In another embodiment, as illustrated in FIG. 3, the mobile machine 102 and the compactor 110 are separate machines. The mobile machine 102 includes the slope determining system 202, a first position determining system 306, and a first controller 302 which performs the same functions as described above with respect to the controller 206 except that the first controller 306 does not control an amount of compaction. The compactor 110 includes a second position determining system 308 and a second controller 304. The second position determining system 308 operates in a similar manner to the first position determining system 306, and may or may not be of the same type, e.g., GPS, dead reckoning, and such.

The first controller 302 determines the locations of the pavement 104 which have deviations from a smooth profile which exceed desired levels, as described above. The information from the first controller 302 is then delivered to the second controller 304 by some method (not shown), such as wireless data communications, manual downloading, and the like. Methods of delivery of information between mobile machines is typically well known in the art and needs no further discussion.

The second controller 203 may then control the amount of compaction of the compactor 110 as the locations in the pavement 104 are traversed. In the preferred embodiment, the second controller 304 increases the amount of compaction in response to a positive profile deviation being greater than a maximum allowable positive profile deviation, and decreases the amount of compaction in response to a negative profile deviation being greater than a maximum allowable negative profile deviation.

Figure 4:
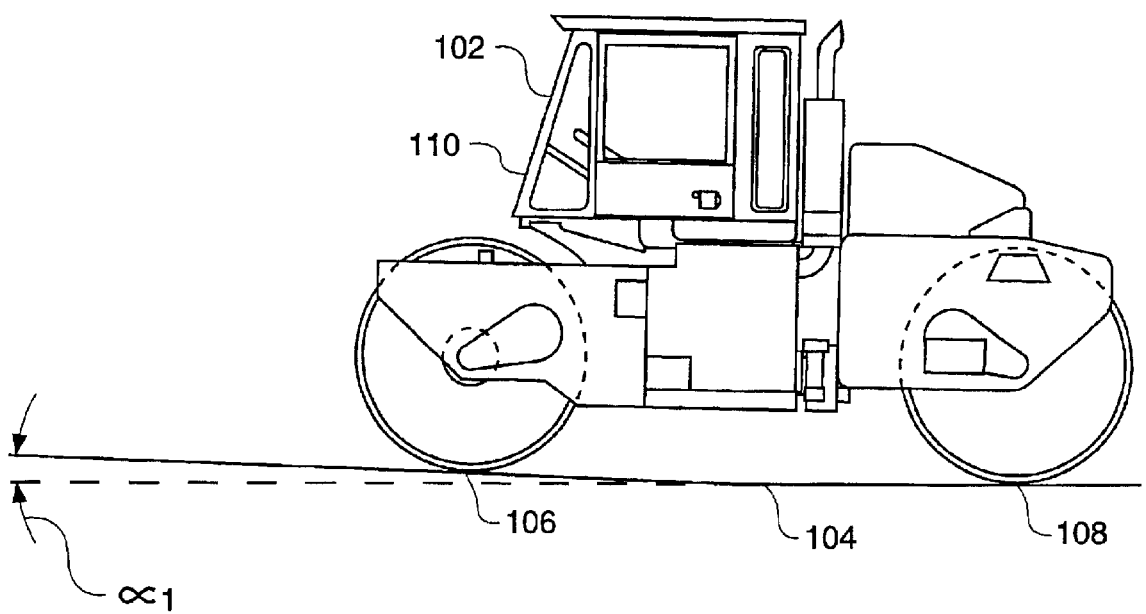
FIG. 4 is a diagrammatic illustration of a mobile machine traversing a pavement having an increase in slope.
Figure 5:
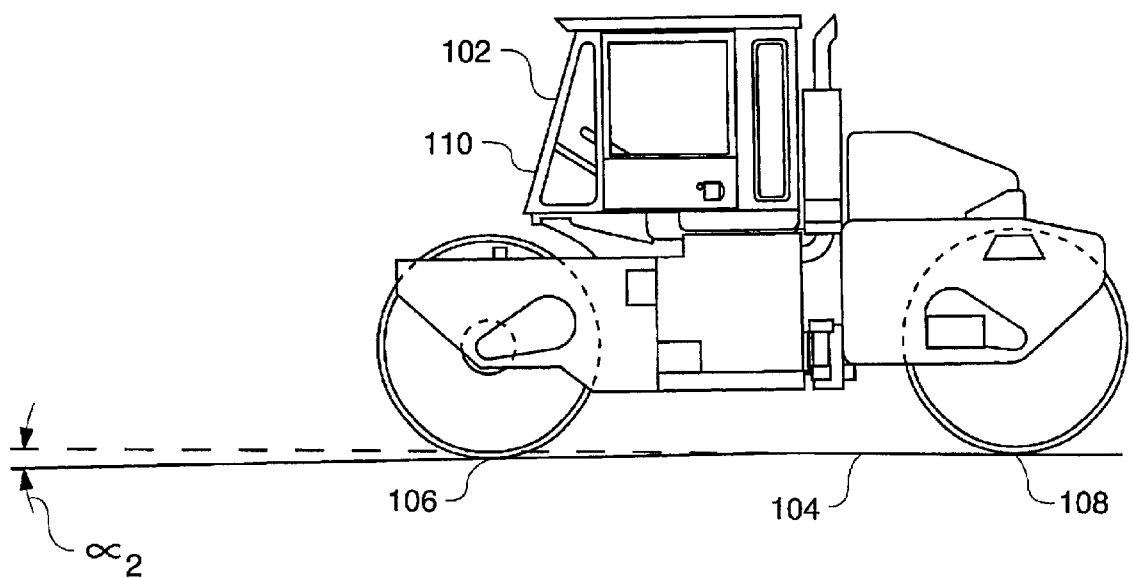
FIG. 5 is a diagrammatic illustration of a mobile machine traversing a pavement having a decrease in slope.

Referring to FIGS. 4 and 5, diagrammatic illustrations of a mobile machine 102 traversing a portion of pavement 104 having a change in slope is shown. Typically, a change in slope which would be of concern would be less than one degree change in slope for a distance of about 5,000 mm of pavement 104, for example 0.23 degrees. FIG. 4 shows a positive change in slope by an angle $\alpha_1$ and FIG. 5 shows a negative change in slope by an angle $\alpha_2$. The compactor 110 would preferably be controlled to increase the amount of compaction in FIG. 4 to reduce $\alpha_1$ and would decrease the amount of compaction in FIG. 5 to reduce $\alpha_2$.

Figure 6:
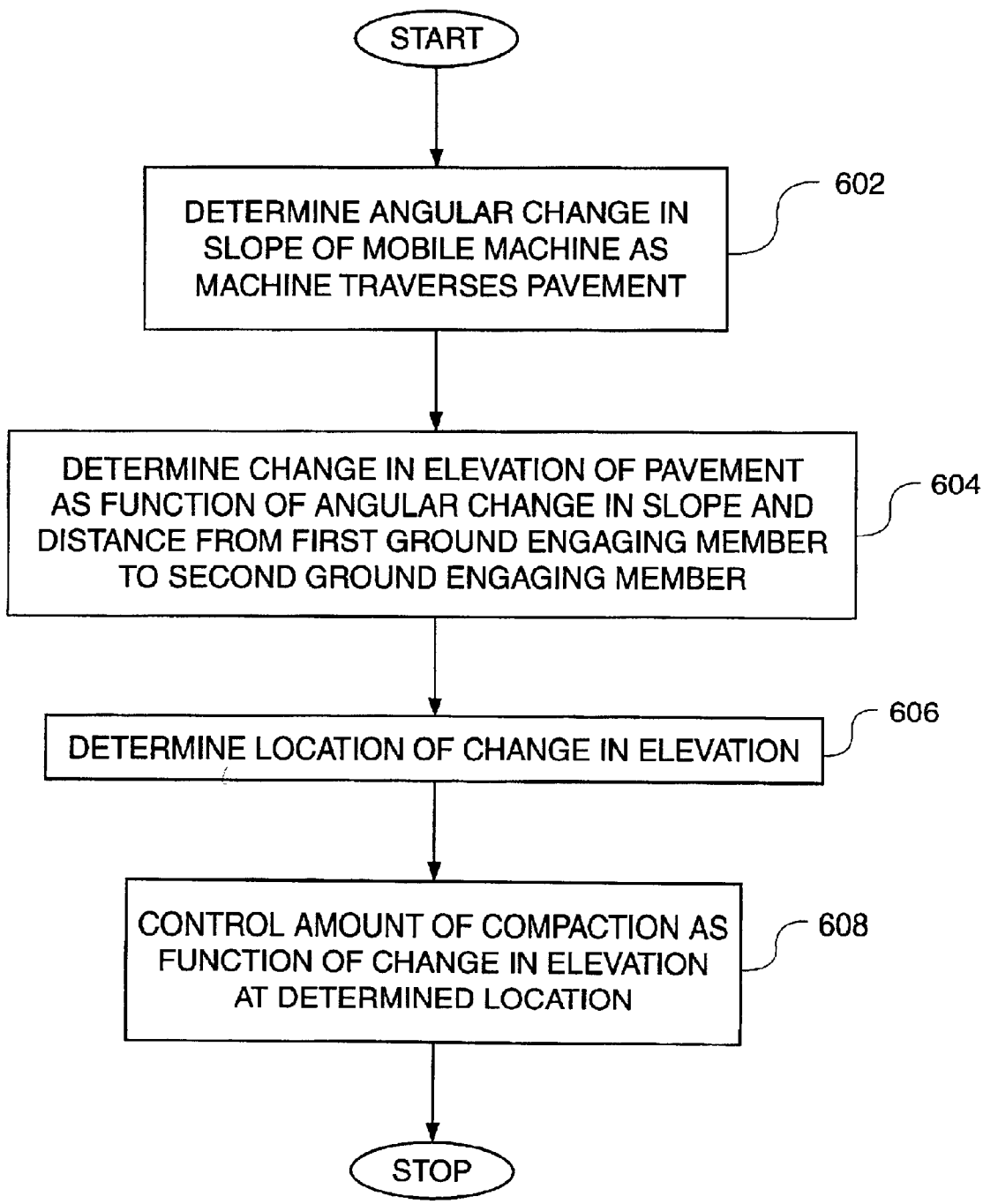
FIG. 6 is a flow diagram illustrating an aspect of a preferred method of the present invention.

Referring to FIG. 6, a flow diagram illustrating a first embodiment of a preferred method of the present invention is shown. The flow diagram of FIG. 6 depicts a method for determining a profile of a pavement 104.

In a first control block 602, an angular change in the slope of the pavement 104 is determined as the mobile machine 102 traverses the pavement 104. Preferably, the angular change is determined by the slope determining system 202, e.g., an inclinometer.

In a second control block 604, a change in elevation of the pavement 104 is determined as a function of the angular slope and the distance from the first ground engaging member 106 to the second ground engaging member 108. In the preferred embodiment, the controller 206 determines the change in elevation using, for example, trigonometric calculations, as described above.

In a third control block 606, the location of the change in elevation is determined, preferably by use of the position determining system 204. The location may be determined in terms of geographic coordinates, or alternatively in terms of a distance along the pavement 104 as the mobile machine 102 travels.

In a fourth control block 608, an amount of compaction is controlled as a function of the profile deviation at the determined location. In one embodiment, the mobile machine 102 is the compactor 110 and the amount of compaction is controlled during the current pass in which the change in elevation is determined, i.e., in real time. In another embodiment, the mobile machine 102 is the compactor 110 and the amount of compaction is controlled during a future pass at the determined location. More specifically, the compactor 110 determines a change in elevation during a first pass, and controls the amount of compaction during a second pass. In yet another embodiment, the mobile machine 102 and the compactor 110 are separate machines, the mobile machine 102 determines a change in elevation, the information is delivered to the compactor 110, and the compactor responsively controls the amount of compaction at the determined location.

Preferably, as described above, the amount of compaction is increased if the profile deviation is determined to be positive, and the amount of compaction is decreased if the profile deviation is determined to be negative.

Figure 7:
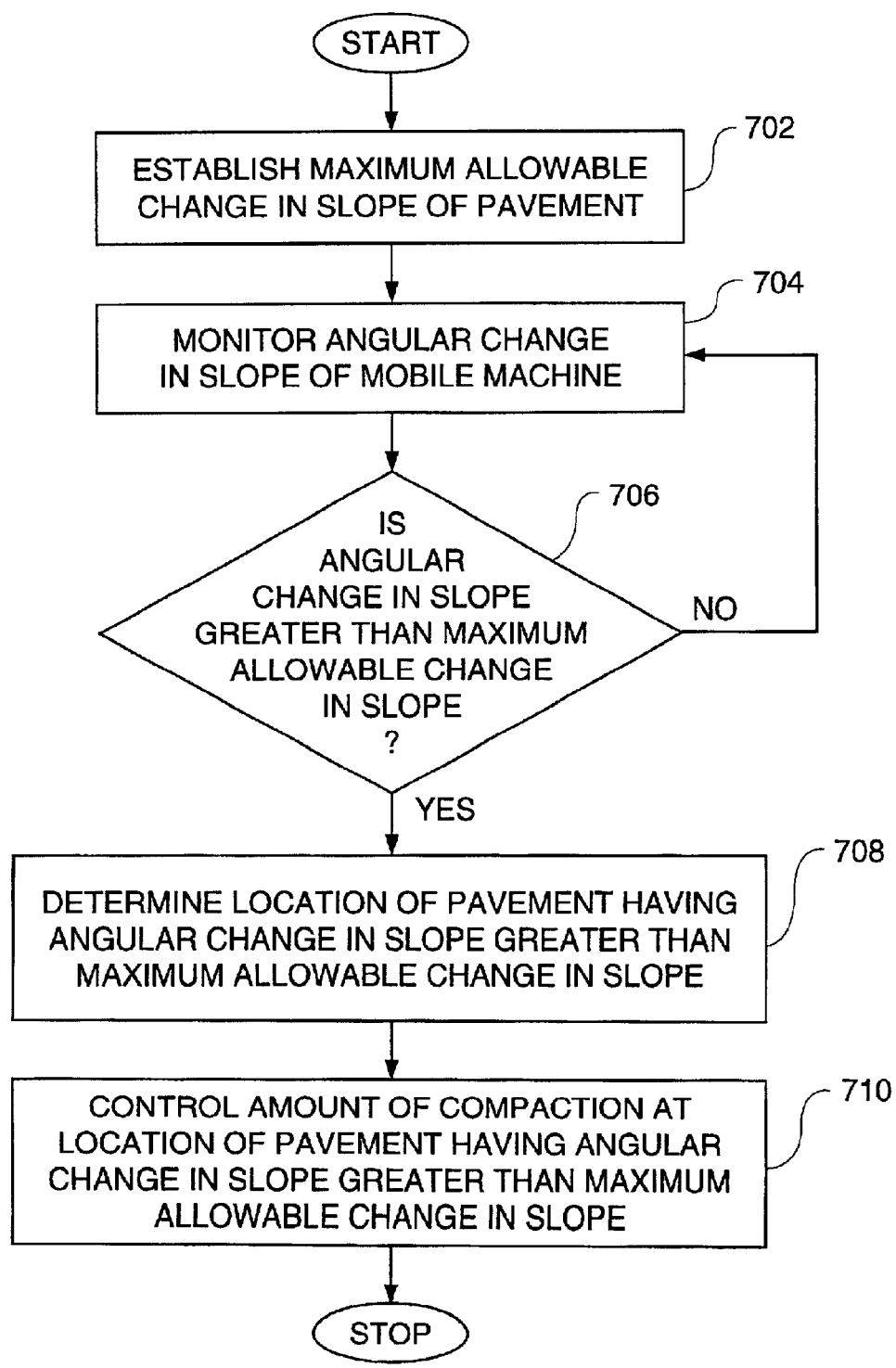
FIG. 7 is a flow diagram illustrating an alternate aspect of a preferred method of the present invention.

Referring to FIG. 7, a flow diagram illustrating a second embodiment of a preferred method of the present invention is shown. The flow diagram of FIG. 7 depicts a method for determining a deviation from a profile specification of a pavement 104.

In a first control block 702, a maximum allowable change in the slope of the pavement 104, i.e., the profile of the pavement 104, is established. The maximum allowable change is preferably expressed as an angle of slope and is preferably a function of the profile specification.

In a second control block 704, the angular slope of the pavement 104 is monitored as the mobile machine 102 traverses the pavement 104. Preferably, the slope is monitored by use of the slope determining system 202, e.g., an inclinometer.

In a first decision block 706, it is determined if an angular change in slope of the pavement 104 is greater than the maximum allowable change in slope. More specifically, it is determined if a positive angular change in slope is greater than a maximum allowable positive change in slope, or if a negative change in slope is greater than a maximum allowable negative change in slope.

If the change in slope is greater than the maximum allowable change in slope, control proceeds to a third control block 708. In the third control block 708, the location of the pavement 104 is determined which has the change in slope which exceeds the maximum allowable change in slope.

In a fourth control block 710, an amount of compaction is controlled at the location of the pavement 104 having an angular change in slope which is greater than the maximum allowable change in slope. Preferably, the amount of compaction is increased if the positive change in slope is too great, i.e., the pavement 104 is too high, and the amount of compaction is decreased if the negative change in slope is too great, i.e., the pavement 104 is too low.

INDUSTRIAL APPLICABILITY

As an example of an application of the present invention, construction of a new pavement or re-paving a currently existing pavement requires compaction of the pavement material to meet quality standards for a pavement profile. One of the primary standards to meet involves the smoothness of the profile itself; that is, a profile which is level within certain tolerances. The present invention allows for a determination of the profile of the pavement during the compaction process, rather than after work is completed. Thus, corrections to the compaction process may be made as the work is being performed. In one aspect of the present invention, the determination of pavement profile and the compaction process may be performed by the same machine, i.e., the compactor, as compaction takes place, thus eliminating the need for an additional machine.

Other aspects, objects, and features of the present invention can be obtained from a study of the drawings, the disclosure, and the appended claims.

What is claimed is:

1. A method for determining a profile of a pavement, including the steps of:

determining an angular slope of a mobile machine as the mobile machine traverses the pavement;

determining a change in elevation of the pavement as a function of the angular slope and a distance from a first ground engaging member on the mobile machine to a second ground engaging member on the mobile machine, the change in elevation being indicative of a profile of the pavement;

determining a location of the change in elevation; and controlling an amount of compaction by a compactor as a function of the change in elevation as the compactor approaches the determined location.

2. A method for determining a profile of a pavement, including the steps of:

determining an annular slope of a compactor as the compactor traverses the pavement;

determining a change in elevation of the pavement as a function of the angular slope and a distance from a first around engaging member on the compactor to a second ground engaging member on the compactor, the change in elevation being indicative of a profile of the pavement; and controlling an amount of compaction by the compactor as a function of the change in elevation.

3. A method for determining a profile of a pavement, including the steps of:

determining an angular slope of a mobile machine as the mobile machine traverses the pavement; and determining a change in elevation of the pavement as a function of the angular slope and a distance from a first ground engaging member on the mobile machine to a second ground engaging member on the mobile machine, the change in elevation being indicative of a profile of the pavement;

comparing the change in elevation to a maximum allowable change in elevation; and wherein determining a change in elevation includes the step of multiplying a sine of the angular slope by the distance from the first ground engaging member to the second ground engaging member.

4. A method, as set forth in claim 3, further including the step of controlling an amount of compaction by a compactor as the compactor traverses the pavement in response to the change in elevation being greater than the maximum allowable change in elevation.

5. A method, as set forth in claim 4, wherein controlling an amount of compaction includes the steps of:

increasing an amount of compaction in response to a positive change in elevation being greater than a maximum allowable positive change in elevation; and decreasing an amount of compaction in response to a negative change in elevation being greater than a maximum allowable negative change in elevation.

6. An apparatus for determining a profile of a pavement, comprising:

a mobile machine having a first ground engaging member and a second ground engaging member, the first ground engaging member being a known distance from the second ground engaging member;

a slope determining system located on the mobile machine;

a first controller located on the mobile machine for receiving a signal indicative of an angular slope from the slope determining system, and responsively determining a change in elevation of the pavement as a function of the angular slope and the distance between the first and second ground engaging members, the change in elevation being indicative of a profile of the pavement;

a first position determining system located on the mobile machine for determining a location of the change in elevation;

a compactor for traversing and responsively compacting the pavement;

a second position determining system located on the compactor; and a second controller located on the compactor for receiving information from the first controller relevant to the change in elevation and the location of the change in elevation, and responsively controlling an amount of compaction at the location of the change in elevation.

7. An apparatus, as set forth in claim 6, wherein the second controller is adapted to increase an amount of compaction in response to a positive change in elevation being greater than a maximum allowable positive change in elevation, and decrease an amount of compaction in response to a negative change in elevation being greater than a maximum allowable negative change in elevation.

8. An apparatus for determining a profile of a pavement, comprising:

a mobile machine having a first around engaging member and a second ground engaging member, the first ground engaging member being a known distance from the second ground engaging member;

a slope determining system located on the mobile machine;

a controller located on the mobile machine for receiving a signal indicative of an angular slope from the slope determining system, and responsively determining a change in elevation of the pavement as a function of the angular slope and the distance between the first and second around engaging members, the change in elevation being indicative of a profile of the pavement;

a position determining system located on the mobile machine for determining a location of the change in elevation; and wherein the mobile machine is a compactor for traversing and responsively compacting the pavement, and wherein the controller is further adapted to determine a position of the change in elevation and responsively control an amount of compaction at the position of the change in elevation.

9. An apparatus, as set forth in claim 8, wherein the controller is adapted to increase an amount of compaction in response to a positive change in elevation being greater than a maximum allowable positive change in elevation, and decrease an amount of compaction in response to a negative change in elevation being greater than a maximum allowable negative change in elevation.

10. An apparatus, as set forth in claim 9, wherein the controller is adapted to determine a change in elevation on a current pass of the compactor and responsively control an amount of compaction on the current pass.

11. An apparatus, as set forth in claim 9, wherein the controller is adapted to determine a change in elevation on a current pass of the compactor and responsively control an amount of compaction on a future pass of the compactor.

12. A method for determining a deviation from a profile specification of a pavement, including the steps of:

establishing a maximum allowable change in slope of the pavement, the maximum allowable change in slope being a function of a maximum allowable profile deviation of the pavement, the maximum allowable profile deviation being indicative of the profile specification;

monitoring an angular change in slope of a mobile machine as the mobile machine traverses the pavement; and determining a condition of the angular change in slope being greater than the maximum allowable change in slope.

13. A method, as set forth in claim 12, further including the step of determining a location of the pavement having an angular change in slope greater than the maximum allowable change in slope.

14. A method, as set forth in claim 13, further including the step of controlling an amount of compaction by a compactor in response to traversing the location of the pavement having an angular change in slope greater than the maximum allowable change in slope.

15. A method for determining a profile of a pavement as a compactor traverses the pavement, including the steps of:

determining an angular change in slope of the compactor during a current pass;

determining a profile deviation of the pavement as a function of the angular change in slope and a distance from a first ground engaging member on the compactor to a second ground engaging member on the compactor, the profile deviation being indicative of the profile of the pavement;

determining a location of the profile deviation; and controlling an amount of compaction by the compactor during a future pass as a function of the profile deviation as the compactor approaches the determined location.

16. A method for determining a profile of a pavement as a compactor traverses the pavement, including the steps of:

determining an angular change in slope of the compactor during a current pass;

determining a profile deviation of the pavement as a function of the angular change in slope and a distance from a first ground engaging member on the compactor to a second ground engaging member on the compactor, the profile deviation being indicative of the profile of the pavement; and controlling an amount of compaction by the compactor during the current pass in response to determining the profile deviation.

17. A method for determining a deviation from a profile specification of a pavement as a compactor traverses the pavement, including the steps of:

establishing a maximum allowable change in slope of the pavement, the maximum allowable change in slope being a function of a maximum allowable profile deviation of the pavement, the maximum allowable profile deviation being indicative of the profile specification;

monitoring an angular change in slope of the compactor during a current pass;

determining a condition of the angular change in slope being greater than the maximum allowable change in slope; and responsively controlling an amount of compaction by the compactor.

18. A method, as set forth in claim 17, wherein controlling an amount of compaction includes the step of controlling the amount of compaction during the current pass.

19. A method, as set forth in claim 17, further including the step of determining a location where the angular change in slope is greater than the maximum allowable change in slope.

20. A method, as set forth in claim 19, wherein controlling an amount of compaction includes the step of controlling the amount of compaction at the determined location during a future pass.

* * * * *